(12) United States Patent
Wheeler et al.

(10) Patent No.: US 11,340,355 B2
(45) Date of Patent: May 24, 2022

(54) VALIDATION OF GLOBAL NAVIGATION SATELLITE SYSTEM LOCATION DATA WITH OTHER SENSOR DATA

(71) Applicant: DeepMap Inc., Palo Alto, CA (US)

(72) Inventors: Mark Damon Wheeler, Saratoga, CA (US); Jeff Adachi, El Cerrito, CA (US); Chen Chen, San Jose, CA (US); Gregory William Coombe, Mountain View, CA (US); Di Zeng, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 443 days.

(21) Appl. No.: 16/564,303

(22) Filed: Sep. 9, 2019

(65) Prior Publication Data

US 2020/0081134 A1 Mar. 12, 2020

Related U.S. Application Data

(60) Provisional application No. 62/728,551, filed on Sep. 7, 2018.

(51) Int. Cl.
*G01S 19/39* (2010.01)
*G05D 1/02* (2020.01)
*G01S 19/47* (2010.01)
*G01S 19/46* (2010.01)
(Continued)

(52) U.S. Cl.
CPC .......... *G01S 19/393* (2019.08); *G01S 19/46* (2013.01); *G01S 19/47* (2013.01); *G01S 19/52* (2013.01); *G05D 1/027* (2013.01); *G05D 1/0231* (2013.01); *G05D 1/0255* (2013.01); *G05D 1/0257* (2013.01); *G05D 1/0278* (2013.01); *G01C 21/32* (2013.01); *G05D 2201/0213* (2013.01)

(58) Field of Classification Search
CPC ........ G01S 19/393; G01S 19/46; G01S 19/47; G01S 19/52; G05D 1/0231; G05D 1/027; G05D 1/0278
USPC .......................................................... 701/23
See application file for complete search history.

(56) References Cited

U.S. PATENT DOCUMENTS 7,298,869 B1 11/2007 Abernathy
8,527,199 B1 9/2013 Burnette et al.
9,357,208 B2 5/2016 Gupta et al.
(Continued)

*Primary Examiner* — Isaac G Smith
(74) *Attorney, Agent, or Firm* — Maschoff Brennan

(57) ABSTRACT

A vehicle computing system validates location data received from a Global Navigation Satellite System receiver with other sensor data. In one embodiment, the system calculates velocities with the location data and the other sensor data. The system generates a probabilistic model for velocity with a velocity calculated with location data and variance associated with the location data. The system determines a confidence score by applying the probabilistic model to one or more of the velocities calculated with other sensor data. In another embodiment, the system implements a machine learning model that considers features extracted from the sensor data. The system generates a feature vector for the location data and determines a confidence score for the location data by applying the machine learning model to the feature vector. Based on the confidence score, the system can validate the location data. The validated location data is useful for navigation and map updates.

26 Claims, 14 Drawing Sheets

(51) Int. Cl.
    *G01S 19/52*    (2010.01)
    *G01C 21/32*    (2006.01)

(56) References Cited

U.S. PATENT DOCUMENTS

| | | |
|---|---|---|
| 10,068,483 B2 | 9/2018 | Torii et al. |
| 2008/0140318 A1 | 6/2008 | Breed |
| 2009/0140887 A1 | 6/2009 | Breed et al. |
| 2009/0262974 A1 | 10/2009 | Lithopoulos |
| 2011/0202204 A1* | 8/2011 | Kahn ............... G01S 19/49 701/3 |
| 2014/0236463 A1 | 8/2014 | Zhang et al. |
| 2014/0340489 A1 | 11/2014 | Medioni et al. |
| 2015/0233720 A1 | 8/2015 | Harada |
| 2016/0092755 A1 | 3/2016 | Fairfield et al. |
| 2016/0291154 A1 | 10/2016 | Nehmadi et al. |
| 2017/0016740 A1 | 1/2017 | Cui et al. |
| 2018/0216942 A1* | 8/2018 | Wang ............... G01S 17/89 |

* cited by examiner

1000

Receive location data including a first set of global coordinates at a first time determined by a plurality of satellite signals and associated with a variance of the plurality of signals from a GNSS receiver on a vehicle
1010

↓

Determine a first velocity of the vehicle with the location data
1020

↓

Generate a probabilistic model of velocity at the first point in time based on the first velocity and the variance of the satellite signals
1030

↓

Receive additional sensor data including acceleration data, image data, LIDAR data, or any combination thereof
1040

↓

Determine a second velocity of the vehicle with the additional sensor data
1050

↓

Calculate a confidence score for the second velocity by applying the probabilistic model to the second velocity
1060

↓

Validate the location data of the GNSS based on the consensus score
1070

↓

| Navigate the vehicle based on the validated location data 1080 | Update a HD map with the validated location data and the additional sensor data 1090 |

```
┌─────────────────────────────────────────────────────────────┐
│ Receive location data including a first set of global       │
│ coordinates at a first time determined by a plurality of    │
│ satellite signals and associated with a variance of the     │
│ plurality of signals from a GNSS receiver on a vehicle      │
│ 1010                                                        │
└─────────────────────────────────────────────────────────────┘
                              │
                              ▼
┌─────────────────────────────────────────────────────────────┐
│ Determine a first velocity of the vehicle with the location │
│ data                                                        │
│ 1020                                                        │
└─────────────────────────────────────────────────────────────┘
                              │
                              ▼
┌─────────────────────────────────────────────────────────────┐
│ Generate a probabilistic model of velocity at the first     │
│ point in time based on the first velocity and the variance  │
│ of the satellite signals                                    │
│ 1030                                                        │
└─────────────────────────────────────────────────────────────┘
                              │
                              ▼
┌─────────────────────────────────────────────────────────────┐
│ Receive image data from a camera located on the vehicle     │
│ 1045                                                        │
└─────────────────────────────────────────────────────────────┘
                              │
                              ▼
┌─────────────────────────────────────────────────────────────┐
│ Determine a second velocity of the vehicle with the image   │
│ data with visual odometry techniques                        │
│ 1055                                                        │
└─────────────────────────────────────────────────────────────┘
                              │
                              ▼
┌─────────────────────────────────────────────────────────────┐
│ Calculate a confidence score for the second velocity by     │
│ applying the probabilistic model to the second velocity     │
│ 1060                                                        │
└─────────────────────────────────────────────────────────────┘
                              │
                              ▼
┌─────────────────────────────────────────────────────────────┐
│ Validate the location data of the GNSS based on the         │
│ consensus score                                             │
│ 1070                                                        │
└─────────────────────────────────────────────────────────────┘
               │                              │
               ▼                              ▼
┌──────────────────────────┐   ┌──────────────────────────────┐
│ Navigate the vehicle     │   │ Update a HD map with the     │
│ based on the validated   │   │ validated location data and  │
│ location data            │   │ the additional sensor data   │
│ 1080                     │   │ 1090                         │
└──────────────────────────┘   └──────────────────────────────┘
```

Receive sensor data including location data from a GNSS receiver on a vehicle, acceleration data from an IMU on the vehicle, image data of an environment surround the vehicle from a camera on the vehicle, and LIDAR data from a LIDAR on the vehicle
1110

Generate a feature vector based on the location data, the acceleration data, the image data, and the LIDAR data
1120

Determine a confidence score by applying a trained machine learning model to the feature vector
1130

Validate the location data of the GNSS based on the confidence score
1140

Navigate the vehicle based on the validated location data
1150

Update a HD map with the validated location data and the additional sensor data
1160

```
┌─────────────────────────────────────────────────────────────────┐
│ Receive location data including plurality of sets of global    │
│ coordinates from a GNSS receiver on the vehicle, each set of   │
│ global coordinates determined by a plurality of satellite      │
│ signals and associated with a variance of the satellite        │
│ signals                                                         │
│ 1205                                                            │
└─────────────────────────────────────────────────────────────────┘
                              ▼
┌─────────────────────────────────────────────────────────────────┐
│                    Receive sensor data                          │
│                           1210                                  │
└─────────────────────────────────────────────────────────────────┘
                              ▼
┌─────────────────────────────────────────────────────────────────┐
│      Generate a HD map with the location data and the sensor data │
│                           1215                                  │
└─────────────────────────────────────────────────────────────────┘
                              ▼
┌─────────────────────────────────────────────────────────────────┐
│ Generate an uncertainty map parallel to the HD map, the        │
│ uncertainty map storing variance of each set of global         │
│ coordinates over a spatial volume                              │
│ 1220                                                            │
└─────────────────────────────────────────────────────────────────┘
                              ▼
┌─────────────────────────────────────────────────────────────────┐
│                    Receive new sensor data                      │
│                           1225                                  │
└─────────────────────────────────────────────────────────────────┘
                              ▼
┌─────────────────────────────────────────────────────────────────┐
│ Determine a location of the vehicle in the HD map according to │
│ the new sensor data                                             │
│ 1230                                                            │
└─────────────────────────────────────────────────────────────────┘
                              ▼
┌─────────────────────────────────────────────────────────────────┐
│ Retrieve a variance for the location of the vehicle in the HD map │
│ 1235                                                            │
└─────────────────────────────────────────────────────────────────┘
                              ▼
┌─────────────────────────────────────────────────────────────────┐
│ Receive new location data including a first set of global      │
│ coordinates from the GNSS receiver                              │
│ 1240                                                            │
└─────────────────────────────────────────────────────────────────┘
                              ▼
┌─────────────────────────────────────────────────────────────────┐
│ Validate the first set of global coordinates according to the  │
│ retrieved variance                                              │
│ 1245                                                            │
└─────────────────────────────────────────────────────────────────┘
```

FIG. 12

VALIDATION OF GLOBAL NAVIGATION SATELLITE SYSTEM LOCATION DATA WITH OTHER SENSOR DATA

CROSS REFERENCE TO RELATED APPLICATIONS

This application claims the benefit of and priority to U.S. Provisional Application 62/728,551 filed on Sep. 7, 2018, which is incorporated by reference in its entirety.

BACKGROUND

This disclosure relates generally to autonomous vehicles, and more particularly to validation of global navigation satellite system location data used for navigation of autonomous vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information instead of relying on sensor data. However conventional maps have several drawbacks that make them difficult to use for an autonomous vehicle. For example, maps do not provide the level of accuracy required for safe navigation (e.g., 10 cm or less). GNSS (Global Navigation Satellite System) provides accuracies of approximately 3-5 meters, but have large error conditions resulting in an accuracy of over 100 m. This makes it challenging to accurately determine the location of the vehicle. GNSS comprises GPS (the Global Positioning System), GLONASS, Galileo, Beidou and other regional systems.

SUMMARY

According to one or more embodiments, a system, for example, a computing system of an autonomous vehicle, receives location data from a Global Navigation Satellite System (GNSS) receiver. The location data includes a first set of global coordinates for the vehicle at a first point in time and a second set of global coordinates for the vehicle at a second point in time. The system determines a first velocity of the vehicle based on the first set of global coordinates and the second set of global coordinates. The system receives additional sensor data including one or more of: acceleration data, image data of an environment surrounding the vehicle, and light detection and ranging (LIDAR) data. The system determines a second velocity of the vehicle based on the additional sensor data. The system generates a probabilistic model with the first velocity and a variance associated with the first set of global coordinates from the satellite signals. The system calculates a confidence score by applying the probabilistic model to the second velocity. The system validates the location data based on the confidence score. The system uses the validated location data in navigating the autonomous vehicle and/or updating a HD map.

According to one or more other embodiments, a system receives sensor data from one or more sensors on an autonomous vehicle. The sensor data include location data from a Global Navigation Satellite System (GNSS) receiver, acceleration data from an inertial measurement unit (IMU), image data of an environment surrounding the autonomous vehicle from a camera, and LIDAR data from a light detection and ranging (LIDAR). The system generates a feature vector comprising features based on the location data, the acceleration data, the image data, and the LIDAR data. The system determines a confidence score for the location data for the vehicle by applying a trained machine learning model to the feature vector. The machine learning model is trained on training data of past trips taken by one or more vehicles (which may or may not include the autonomous vehicle) with sensor data associated with the past trips. The trained machine learning model inputs a feature vector based on the location data, the acceleration data, the image data, and the LIDAR data and outputs a confidence score for each set of global coordinates in the location data. The system validates the location data based on the confidence score. The system uses the validated location data in navigating the autonomous vehicle.

According to one or more embodiments, a system receives location data including a first set of global coordinates for the autonomous vehicle at a first point in time and a second set of global coordinates for the autonomous vehicle at a second point in time from a Global Navigation Satellite System (GNSS) receiver located on an autonomous vehicle. The system determines a first velocity of the autonomous vehicle based on the first set of global coordinates and the second set of global coordinates. The system generates the probabilistic model with the first velocity and a variance associated with the first set of global coordinates. The system receives image data of an environment surrounding the autonomous vehicle from a camera located on the vehicle. The system determines a second velocity of the autonomous vehicle by performing visual odometry on the image data of the environment. In some implementations, the system utilizes a machine learning model to calculate the velocity based on the image data. The system calculates a confidence score by applying the probabilistic model to the second velocity. The system validates the location data based on the consensus score. The system uses the validated location data in navigating the autonomous vehicle and/or updating the HD map.

BRIEF DESCRIPTION OF THE DRAWINGS

FIGS. 10A & 10B are flowcharts illustrating validation of location data with a velocity consensus, according to some embodiments.

FIG. 11 is a flowchart illustrating validation of location data with a machine learning model, according to one or more embodiments.

FIG. 12 is a flowchart illustrating use of an uncertainty map to validate GNSS location data, according to one or more embodiments.

Figure 1:
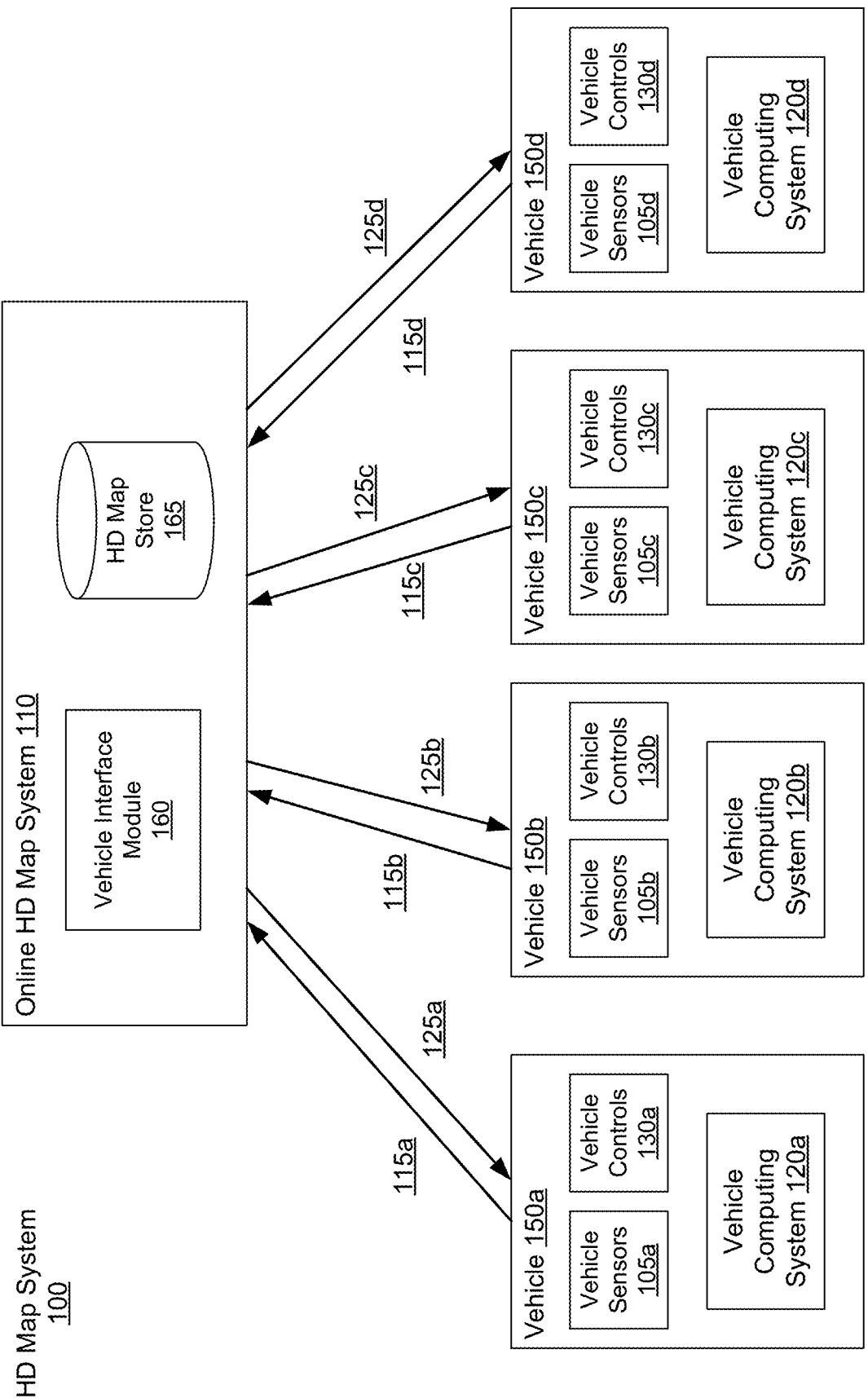
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

An HD map system maintains high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time-consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. HD map system provides location as a service (LaaS) such that autonomous vehicles of different manufacturers can each have access to the most up-to-date map information created via these embodiments of the invention.

The HD map system generates and maintains high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographic region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing low latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
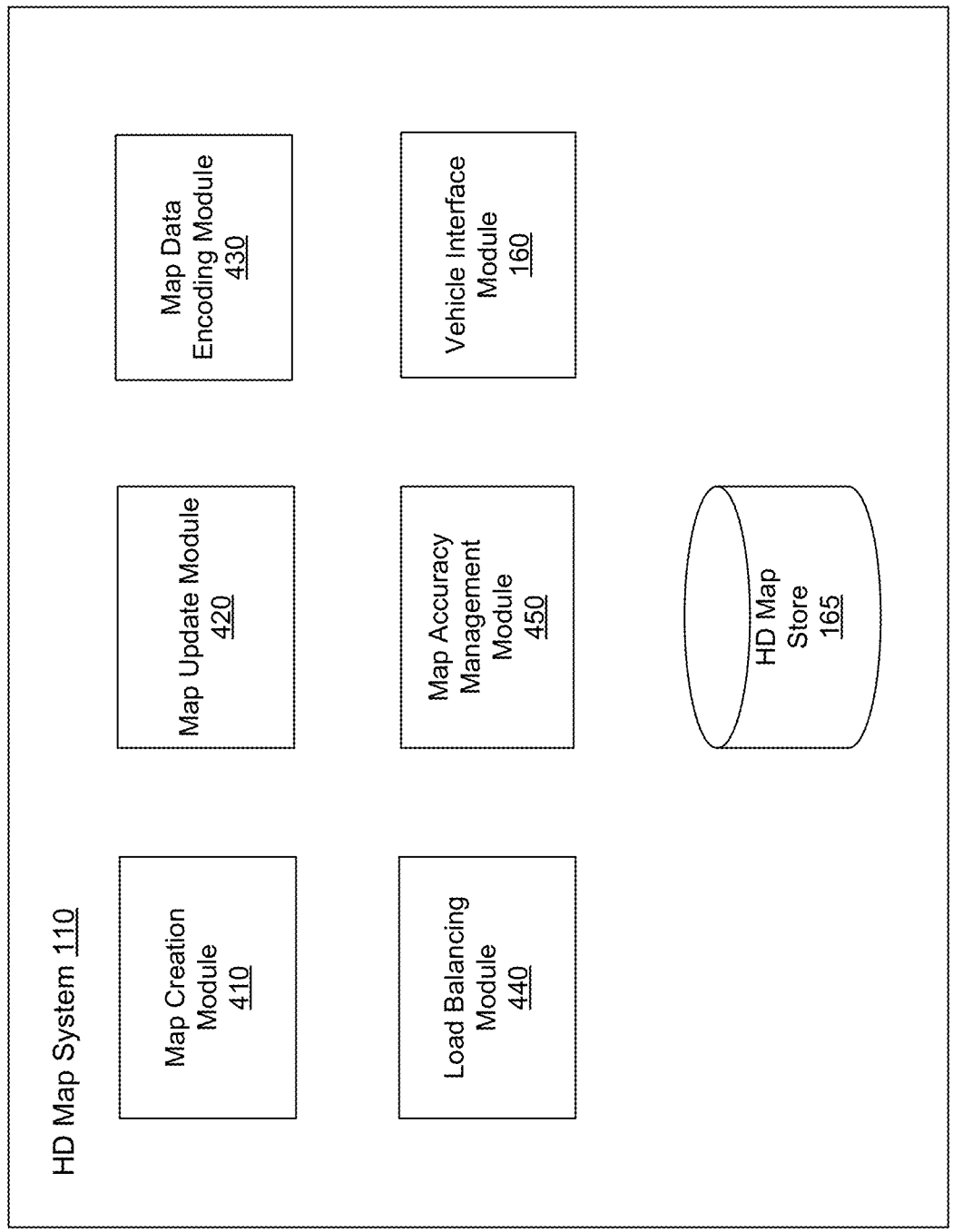
FIG. 4 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a sound detection and ranging (SONAR) sensor, a radio detection and ranging (RADAR) sensor, a wheel odometer, a global navigation satellite system (GNSS) receiver, an inertial measurement unit (IMU), and others. The one or more cameras capture images of the surroundings of the vehicle. A LIDAR sensor surveys the surroundings of the vehicle by measuring distance to a target by illuminating that target with a laser light pulses, and measuring the reflected pulses. A SONAR sensor and a RADAR sensor also measure distances of the surroundings of the vehicle, like the LIDAR, but with sound waves and radio waves, respectively. A wheel odometer measures wheel rotation, which can be used to calculate a velocity of the vehicle 150 with known circumference of the wheel. The GNSS navigation system determines the position of the vehicle 150 based on signals from a plurality of satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
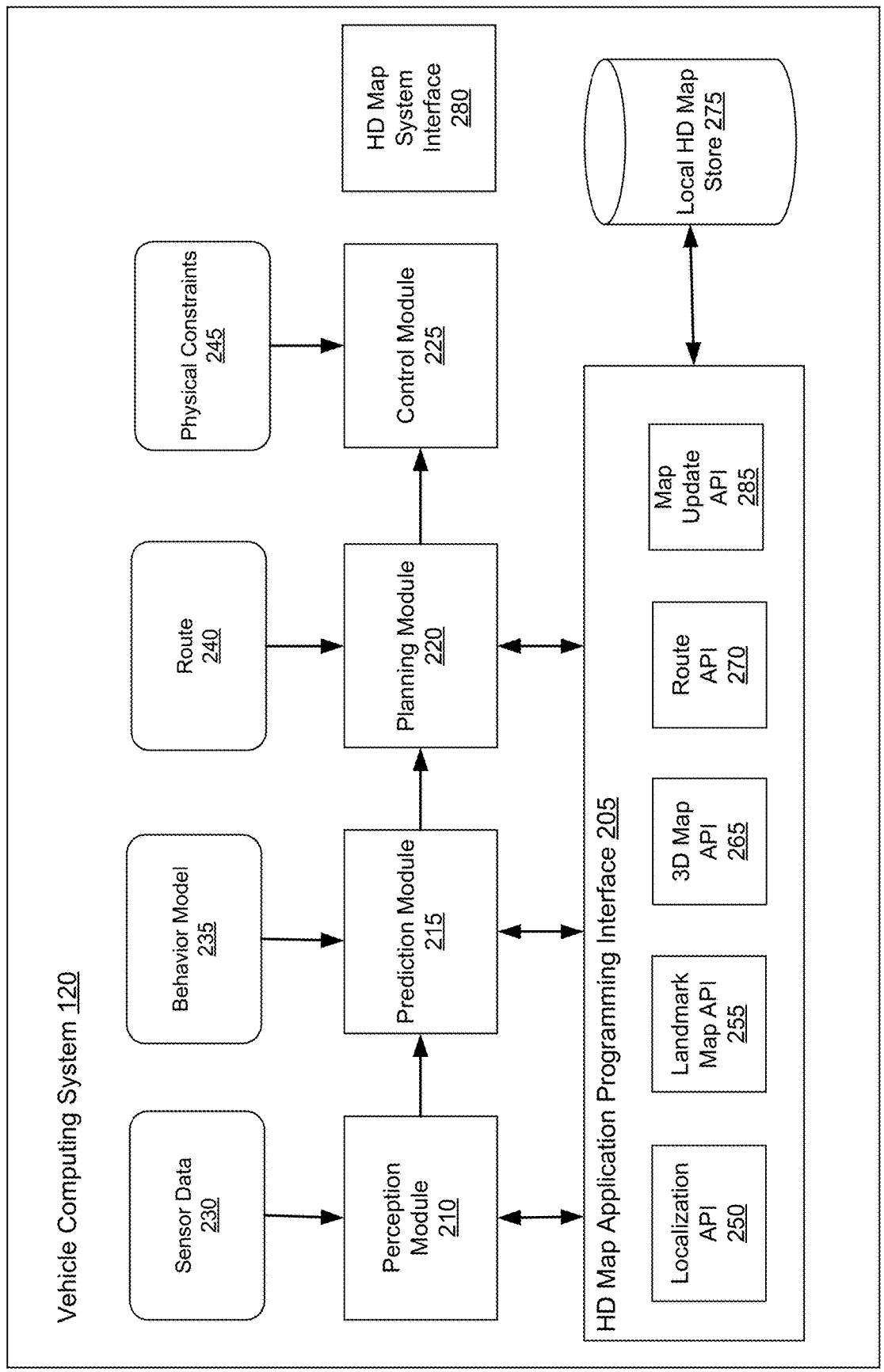
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GNSS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215. According to this present disclosure, the perception module 210 validates the location data received from a GNSS receiver with the other sensor data.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 200 to plan the subsequent actions that the vehicle needs to take next.

The planning module 200 receives the information describing the surroundings of the vehicle from the prediction module 215, the route 240 that determines the destination of the vehicle, and the path that the vehicle should take to get to the destination. The planning module 200 uses the information from the prediction module 215 and the route 240 to plan a sequence of actions that the vehicle needs to take within a short time interval, for example, within the next few seconds. In an embodiment, the planning module 200 specifies the sequence of actions as one or more points representing nearby locations that the vehicle needs to drive through next. The planning module 200 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on.

The control module 225 determines the control signals for sending to the controls 130 of the vehicle based on the plan received from the planning module 200. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, uncertainty map queries, and occupancy map queries further described herein. The localize API receives inputs comprising one or more of, location provided by GNSS, vehicle motion data provided by IMU, LIDAR scanner data, and camera images. The localize API returns an accurate location of the vehicle as latitude and longitude coordinates. The coordinates returned by the localize API are more accurate compared to the GNSS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GNSS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 365 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150. In one example according to this present disclosure, in response to validating location data, the map update API 285 determines a discrepancy between the HD map data and the additional sensor data. If the discrepancy is sufficiently large, the map update API 285 updates the HD map with the additional sensor data.

In some embodiments, the map update API 285 generates an uncertainty map that comprises uncertainty scores for various regions of the uncertainty map. The map update API 285 receives the location data from a GNSS receiver, wherein each set of global coordinates in the location data is associated with a variance over a spatial window based on the imprecision among the satellite signals used to determine the global coordinates. The uncertainty scores stored in the uncertainty map may be the variances associated with the location data. In other embodiments, the uncertainty scores may be confidence scores, explained further in FIGS. 9-11. The uncertainty map may parallel the HD map such that as a vehicle is localized in the HD map (e.g., while navigating a route), the vehicle computing system 120 may query the uncertainty map to predict an uncertainty when new location data is received by the GNSS receiver. This would prove useful in environments highly prone to GNSS inaccuracies providing quick indications of GNSS accuracies with the uncertainty map. Moreover, the vehicle computing system 120 can use the uncertainty map to identify regions of the uncertainty map where GNSS tends to be inaccurate. The map update API 285 may generate the uncertainty map around when creating the HD map, e.g., in tandem, in quick succession, etc.

FIG. 4 illustrates the various layers of instructions in the HD Map API of a vehicle computing system, according to an embodiment. Different manufacturers of vehicles have different instructions for receiving information from vehicle sensors 105 and for controlling the vehicle controls 130. Furthermore, different vendors provide different computer platforms with autonomous driving capabilities, for example, collection and analysis of vehicle sensor data. Examples of computer platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several computer platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
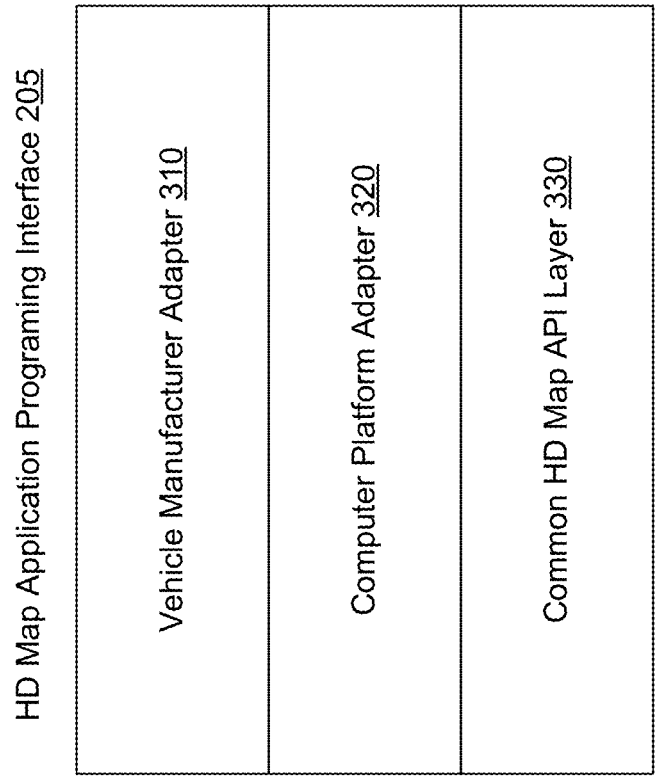
FIG. 3 illustrates the various layers of instructions in the HD Map API of a vehicle computing system, according to an embodiment.

As shown in FIG. 3, in an embodiment, the HD map API is implemented as a library that includes a vehicle manufacturer adapter 310, a computer platform adapter 320, and a common HD map API layer 330. The common HD map API layer comprises generic instructions that can be used across a plurality of vehicle computer platforms and vehicle manufacturers. The computer platform adapter 320 include instructions that are specific to each computer platform. For example, the common HD Map API layer 330 may invoke the computer platform adapter 320 to receive data from sensors supported by a specific computer platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores computer platform adapters 320 for a plurality of computer platforms and vehicle manufacturer adapters 310 for a plurality of vehicle manufacturers. The online HD map system 110 determines the particular vehicle manufacturer and the particular computer platform for a specific autonomous vehicle. The online HD map system 110 selects the vehicle manufacturer adapter 310 for the particular vehicle manufacturer and the computer platform adapter 320 the particular computer platform of that specific vehicle. The online HD map system 110 sends instructions of the selected vehicle manufacturer adapter 310 and the selected computer platform adapter 320 to the vehicle computing system 120 of that specific autonomous vehicle. The vehicle computing system 120 of that specific autonomous vehicle installs the received vehicle manufacturer adapter 310 and the computer platform adapter 320. The vehicle computing system 120 periodically checks if the online HD map system 110 has an update to the installed vehicle manufacturer adapter 310 and the computer platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module, a vehicle interface module, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently travelled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
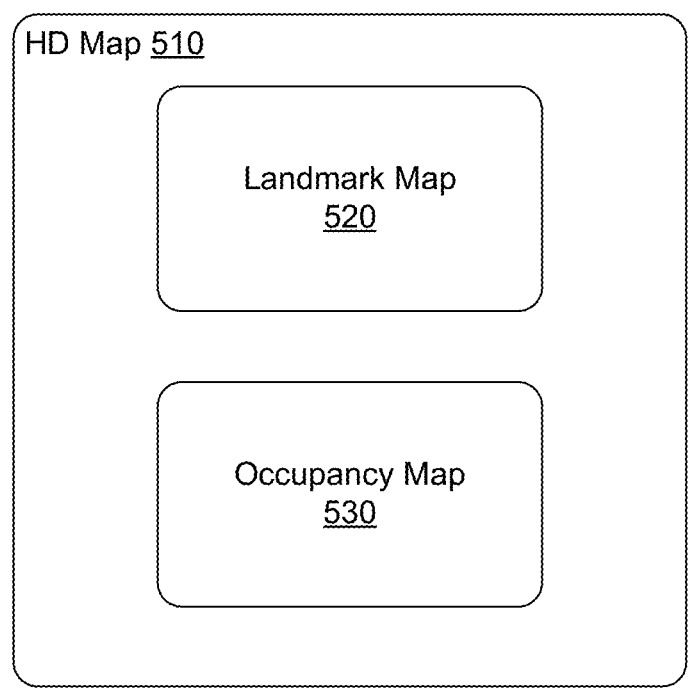
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a large physical area into geographical regions and stores a representation of each geographical region. Each geographical region represents a contiguous area bounded by a geometric shape, for example, a rectangle or square. In an embodiment, the online HD map system 110 divides a physical area into geographical regions of the same size independent of the amount of data required to store the representation of each geographical region. In another embodiment, the online HD map system 110 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the online HD map system 110 determines the size of a geographical region based on an estimate of an amount of information required to store the various elements of the physical area relevant for an HD map.

In an embodiment, the online HD map system 110 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6B:
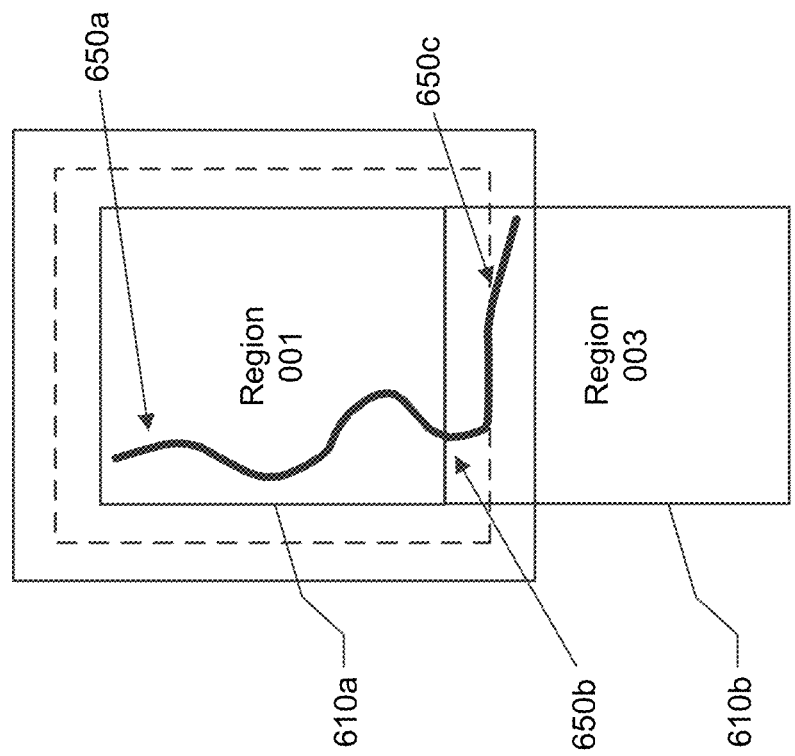
FIGS. 6A-B illustrate geographical regions defined in an HD map, according to an embodiment.
Figure 6A:
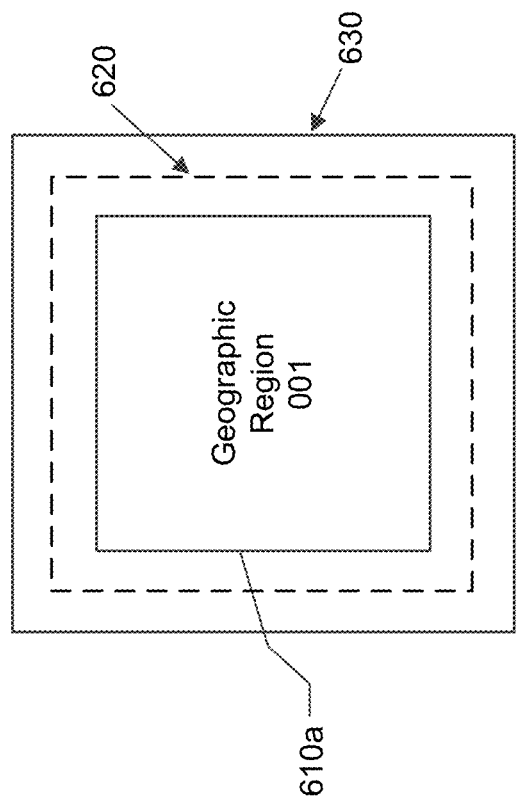

FIGS. 6A-B illustrate geographical regions defined in an HD map, according to an embodiment. FIG. 6A shows a square geographical region 610a. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 610a and a boundary 630 for buffer of 100 meters around the geographic region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it crosses the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
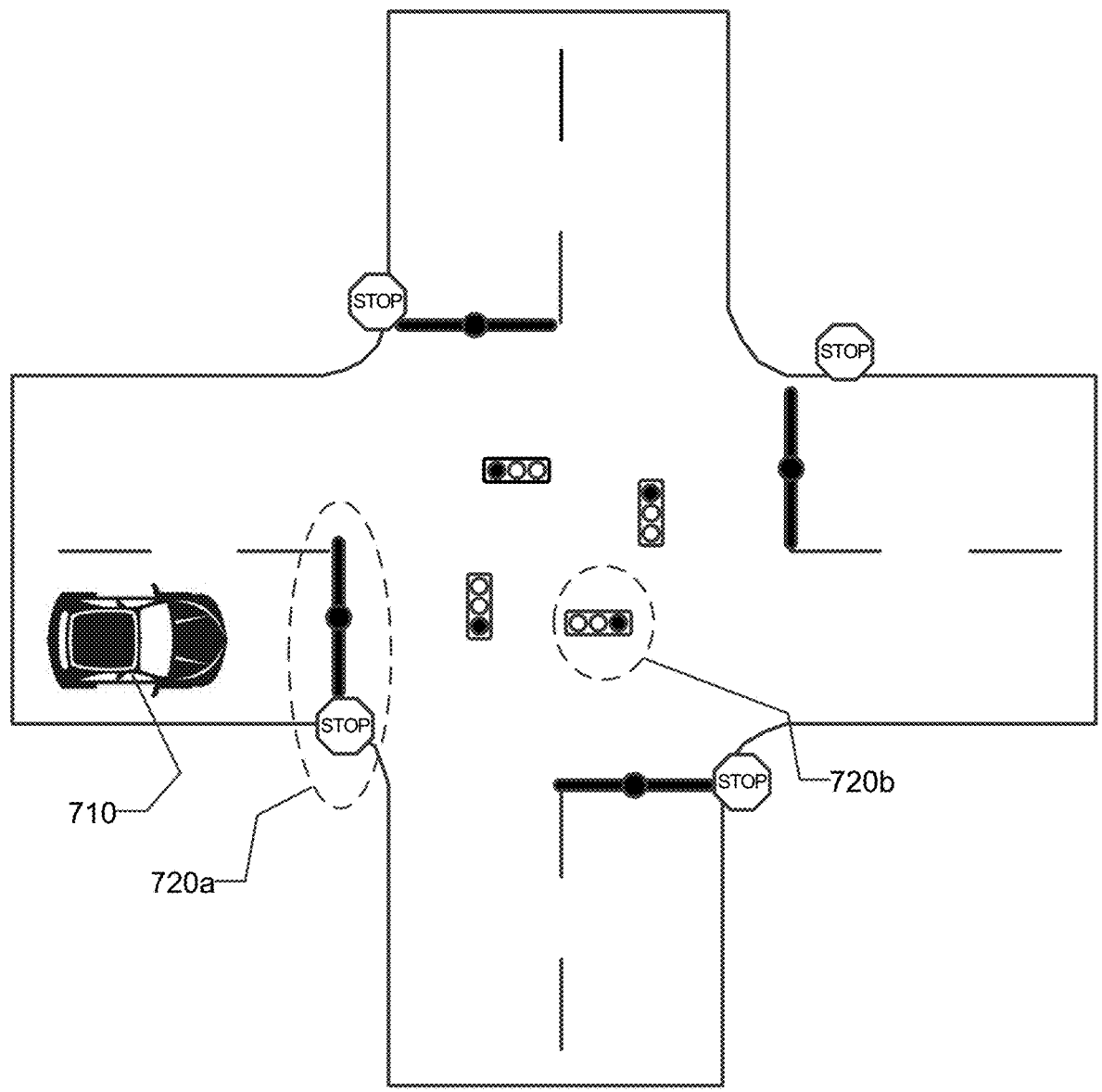
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

Figure 8A:
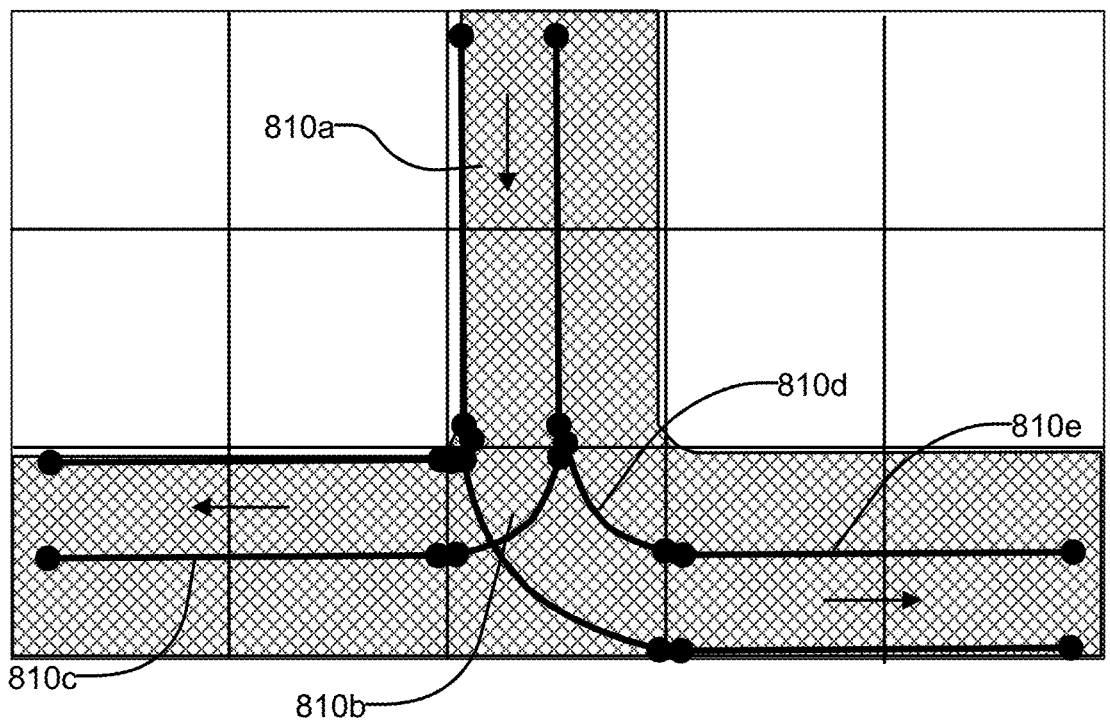
FIGS. 8A-B illustrates lane elements and relations between lane elements in an HD map, according to an embodiment.
Figure 8B:
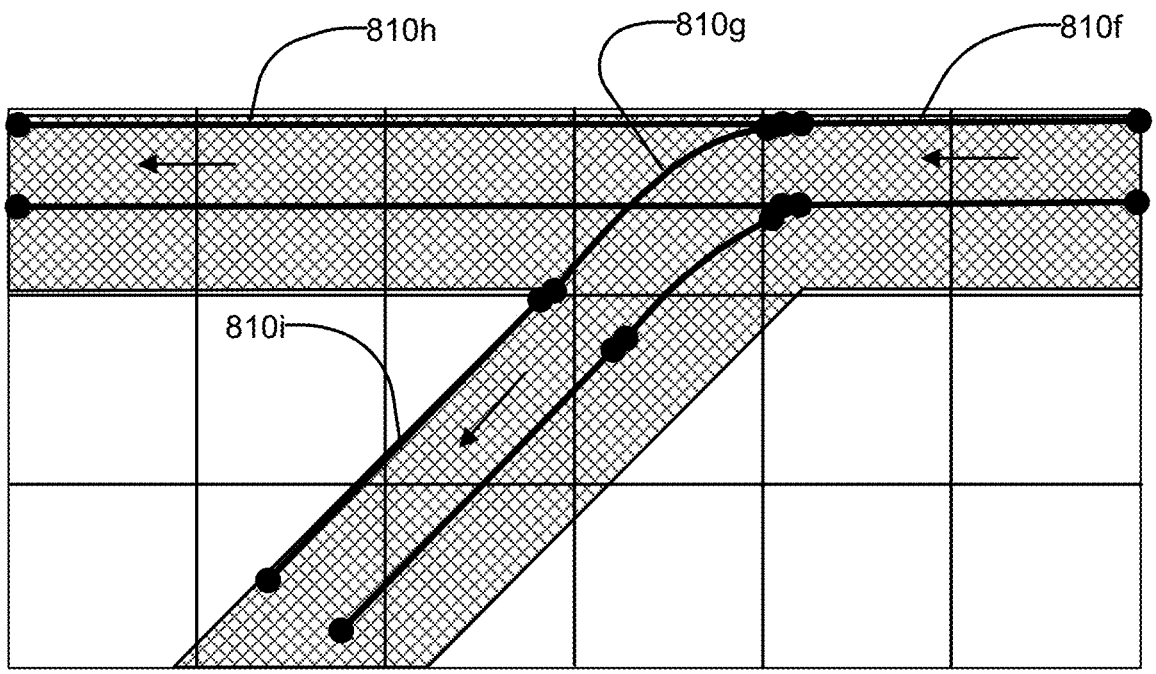

FIGS. 8A-B illustrates lane elements and relations between lane elements in an HD map, according to an embodiment. FIG. 8A shows an example of a T junction in a road illustrating a lane element 810a that is connected to lane element 810c via a turn lane 810b and is connected to lane 810e via a turn lane 810d. FIG. 8B shows an example of a Y junction in a road showing label 810f connected to lane 810h directly and connected to lane 810i via lane 810g. The HD map system 100 determines a route from a source location to a destination location as a sequence of connected lane elements that can be traversed to reach from the source location to the destination location.

Validating GNSS Accuracy

This disclosure describes various embodiments for high definition map based localization optimization. Embodiments of the invention validate location data describing a position of a vehicle. For example, the HD map system validates the location data GNSS signal with the invention. The benefit of this validation technique most clearly manifests in situations where interference that is location specific (e.g., caused by trees, buildings, mountains) may compromise the GNSS signal. Although the techniques disclosed herein are described in connection with location data received from a GNSS receiver, the techniques can be used for validating data of other sensors or processes whose error may vary with location. As another example, the validation technique can also be applied to validate readings from magnetic compasses, since interference with the Earth's magnetic field can also be location specific.

The HD map system receives absolute global coordinates from a GNSS receiver. However, global coordinates determined by the GNSS receiver may often be compromised by signal reflection or loss from when the GNSS signal is transmitted by a satellite part of GNSS to when the GNSS receiver detects the GNSS signal. The compromised global coordinates can be significantly inaccurate, as much as over 100 meters. Common causes of inaccuracy in GNSS are dilution of precision (DOP, reflecting the geometry of the visible satellites) and the multipath problem (caused by the radio signals from satellites bouncing off reflective surfaces like buildings). Some traditional solutions implemented in GNSS receivers for addressing multipath detection and mitigation involve hardware (for example, choke ring antenna, ground planes, polarization filters, multiple antenna arrays) and software (for example, analysis of signal to noise rotations, smoothing carrier phases).

Some other solutions rely on signals from an Inertial Measurement Unit (IMU) to obtain relative motion accuracy. However, IMU provides a differential measurement.

The HD map system can integrate (once resulting in velocity and/or twice resulting in relative position) differential measurements received from IMU to get a relative path of the vehicle. However, situations may arise when integration of noise in the IMU readings builds up resulting in less and less accurate relative position estimates. This loss in accuracy can be mitigated with using high grade IMUs which are extremely costly.

Figure 9:
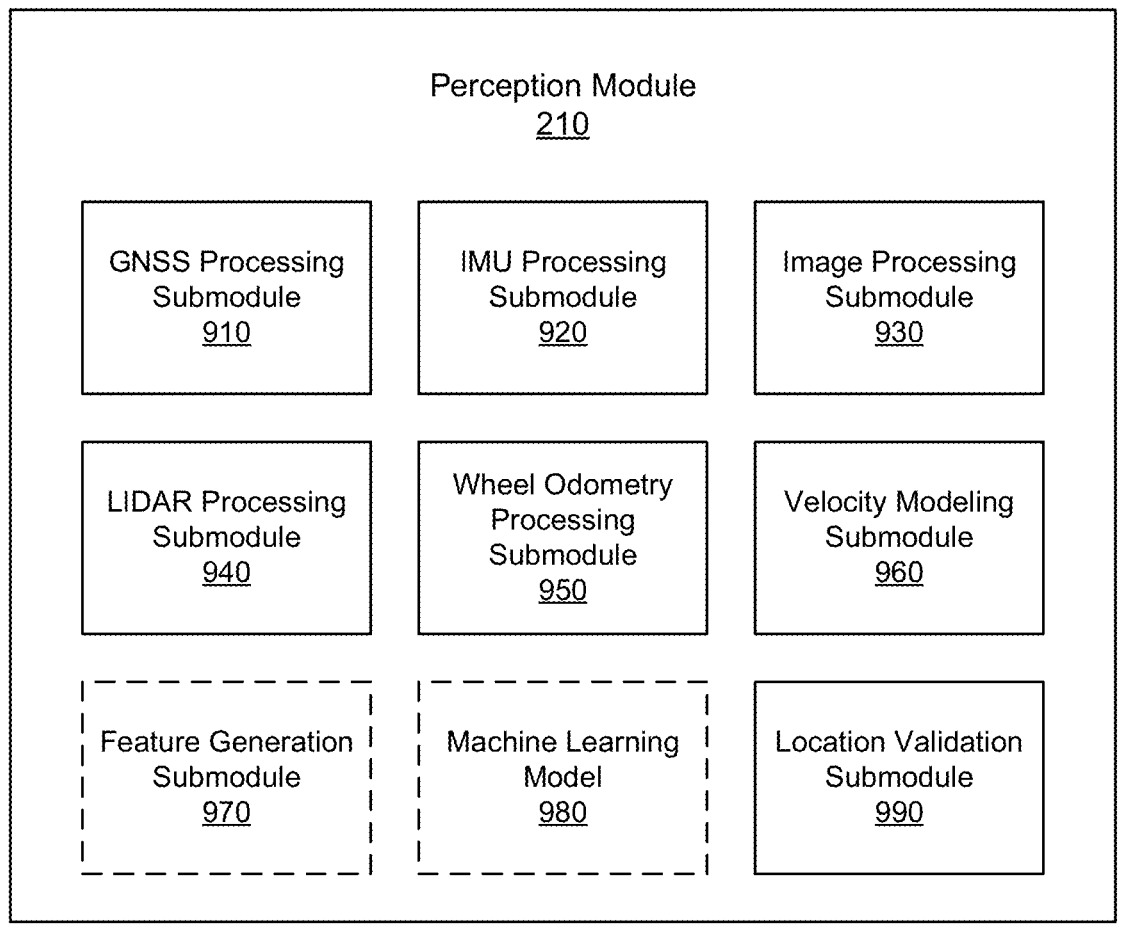
FIG. 9 illustrates submodules included in the perception module, according to one or more embodiments.

FIG. 9 illustrates submodules included in the perception module 210, according to one or more embodiments. The perception module 210, as described above, processes the sensor data 230. In addition, the perception module 210 validates the location data received from a GNSS receiver with additional sensor data. The sensor data 230 includes location data received from a GNSS receiver, acceleration data received from an IMU, image data received from a camera, LIDAR data received from a LIDAR, sound detection and ranging (SONAR) data received from a SONAR, radio detection and ranging (RADAR) data received from a RADAR, wheel odometry data received from a wheel odometer, or any combination thereof.

According to one embodiment, the perception module 210 includes a GNSS processing submodule 910, an IMU processing submodule 920, an image processing submodule 930, a LIDAR processing submodule 940, a velocity modeling submodule 960, and a location validation submodule 990. With these submodules, the perception module 210 may compare calculated velocities based on two or more types of sensor data. The validation of the location data is then based on a consensus score calculated according to a comparison of the calculated velocities. According to another embodiment, the perception module 210 includes a feature generation submodule 970 and a machine learning (ML) model 980 which are used to determine a confidence score for the location data. In other embodiments, the perception module 210 comprises additional or fewer components than those listed herein. Alternatively, the various operations performed by the various submodules as described in the following section can be variably distributed among the submodules.

The GNSS processing submodule 910 processes location data received from the GNSS receiver. Location data includes one or more sets of global coordinates determined at one or more points in time. A set of global coordinates specify latitude, longitude, and altitude at a point in time. Each set of global coordinates may be accompanied by one or more satellite signals received by the GNSS receiver used to determine the set of global coordinates. Each satellite signal is received at a radio frequency and may further describe a unique identifier of the satellite part of the GNSS sending the signal and a time of the signal transmission. Generally, to determine a set of global coordinates, the GNSS receiver (or the GNSS processing submodule 910) calculates a quadrilateration of four satellite signals. Quadrilateration identifies the intersect between four distances from four satellites. A distance from the GNSS receiver to a corresponding satellite is based on the time of flight of the signal from satellite to GNSS receiver. In some instances, the GNSS receiver may determine a set of global coordinates by establishing a ground plane and then performing trilateration with three satellite signals, identifying an intersection between three distances from three satellites. Each set of global coordinates is also associated with a variance obtained by imprecision among the satellite signals. This may be useful in scenarios where four satellite signals are not detected at a given time.

In one or more embodiments, the GNSS processing submodule 910 calculates a velocity according to the location data received from the GNSS receiver. The GNSS processing submodule 910 can calculate the velocity in a few manners. In a first, manner, the GNSS processing submodule 910 samples two sets of global coordinates at two different points in time. The GNSS processing submodule 910 calculates a distance between the two sets of global coordinates, e.g., a Euclidean distance or a spherical distance given Earth's spherical nature. The GNSS processing submodule 910 divides the distance by a differential of the two points in time as the velocity. This manner may be expanded to taking a time derivative of all global coordinates in the location data yielding a velocity time-series.

According to a second manner, the GNSS processing submodule 910 calculates a velocity with the location data by measuring a Doppler shift with a satellite signal. A satellite part of the GNSS transmits signals at a particular frequency. When detected by the GNSS receiver in motion, the satellite signal is detected at a shifted frequency due to the Doppler effect. The GNSS processing submodule 910 can calculate a velocity with a satellite signal according to the detected radio frequency. As a qualitative example, a satellite of the GNSS transmits at 100 kilohertz (kHz). If the GNSS receiver is in motion towards the satellite, the detected radio frequency will be higher than the initial transmission frequency of 100 kHz. In complementary fashion, if the GNSS receiver is in motion away from the satellite, the detected radio frequency will be lower than the initial transmission frequency of 100 kHz. There is a direct dependency on the velocity with how shifted the detected radio frequency is from the initial transmission frequency. The GNSS processing submodule 910 may calculate a velocity with each of the detected satellite signals.

In some embodiments, the GNSS processing submodule 910 can also calculate a velocity based on past localization data of the vehicle. The perception module 210 may log past localization data of the vehicle describing relative positions of the vehicle. The relative positions may be in a HD map or in global coordinates. The GNSS processing submodule 910 can calculate the velocity of the vehicle based on a distance between relative positions over a time differential between the relative positions.

The IMU processing submodule 920 calculates a velocity of the vehicle based on the acceleration data. As described above, the IMU processing submodule 920 can integrate the acceleration data over time to get a velocity time-series of the vehicle's relative motion path. In some embodiments, the IMU processing submodule 920 may apply a smoothing algorithm to the acceleration data prior to integration to reduce effects of noise on the calculated velocity. One example is a Kalman filter that takes a moving average to reduce the IMU bias or noise.

The image processing submodule 930 calculates a velocity of the vehicle based on the image data. The image data includes one or more frames taken at different points in time of an environment surrounding the vehicle. The image data may be monocular (e.g., taken with a single camera) or stereoscopic (e.g., taken with two cameras). Between two frames in the image data, a motion of the vehicle manifests in change of objects within the frame. The image processing submodule 930 may implement machine-learning and non machine-learning approaches to calculating a velocity of the vehicle.

In some embodiments, the image processing submodule 930 implements a trained machine learning model that takes pairs of images and predicts a velocity. In one implementation, the machine learning model may take monocular image data and predict the velocity. To train the machine learning model, monocular training image data may be collected from video data captured by cameras moving at known velocities. In another implementation, the machine learning model may take stereoscopic image data and predict the velocity. To train the machine learning model, stereoscopic training image data may be collected from stereoscopic cameras.

In some embodiments, the image processing submodule 930 tracks features in the image data to determine a velocity of the vehicle. The image processing submodule 930 identifies features in a first frame of the image data and then identifies features in a second frame of the image data. The two frames may have different timestamps—taken at different points in time with a single camera—or two frames that constitute a stereoscopic image pair—taken at substantially the same point in time from two cameras. The features may be identified by applying one or more image kernels the frames, e.g., wherein the features may be an outline of the image, one or more objects (moving or fixed), etc. The image processing submodule 930 establishes an image correspondence between the two frames based on matching the identified features in the first frame to the identified features in the second frame. The image processing submodule 930 then calculates a velocity of the vehicle with visual odometry techniques based on a comparison of the features between the first frame and the second frame. One implementation calculates an optical flow by determining a difference in positions of features in the first frame and positions of the features in the second frame. The image processing submodule 930 calculates a displacement of the camera between the first frame and second frame with 3D bundle adjustment techniques that map 3D positions of one or more correspondences in the frames with stereo geometry. The image processing submodule 930 calculates a joint optimization with relevant correspondences to determine a displacement of the camera from the first frame to the second frame. The image processing submodule 930 calculates the velocity by dividing the displacement over a time differential between the first point in time and the second point in time.

In some embodiments, the image processing submodule 930 may determine a location type of the environment where the vehicle is located based on the image data. The image processing submodule 930 may perform image analysis techniques to determine potential obstructions or indicative objects in an environment and categorize the environment by location type, wherein each location type each includes a range of GNSS satellite signal strengths. For example, location types include an open GNSS signal strength identified by lack of objects obscuring the sky, a sparse GNSS signal strength identified by one or more tall buildings in proximity to the vehicle or by one or more objects partially obscuring the sky, and a denied GNSS signal strength such as tunnels or garages identified by one or more objects substantially obscuring the sky. Other location types may further include suburb, bridge, forest, mountain, dessert, canyon, etc. Techniques for determining location type of a vehicle using various mechanisms are described in the U.S. patent application Ser. No. 16/208,026, filed on Dec. 3, 2018, which is incorporated by reference herein in its entirety.

The LIDAR processing submodule 940 calculates a velocity of the vehicle based on LIDAR data. The LIDAR data includes one or more LIDAR scans taken at different points in time of an environment surrounding the vehicle. Each LIDAR scan comprises a LIDAR point cloud with each point in the point cloud indicating a distance of any object from the LIDAR at the point of time of the LIDAR scan. The LIDAR processing submodule 940 can identify a stationary object in two different LIDAR point clouds. This can be done via machine learning techniques or other LIDAR analysis techniques. The position of the stationary object in each of the two different LIDAR point clouds can be used to calculate the vehicle's velocity between the points in time of the two LIDAR point clouds. In embodiments with a radio detection and ranging (RADAR) and/or a sound detection and ranging (SONAR), the principles described with the LIDAR processing submodule 940 can be analogously applied to the RADAR data and the SONAR data. Techniques for detection and ranging based odometry are described in U.S. patent application Ser. No. 15/855,116 filed on Dec. 27, 2017 which is incorporated by reference herein in its entirety.

The wheel odometry processing submodule 950 calculates a velocity from wheel odometry data. The wheel odometry data may be for one or more of the wheels on the vehicle 150. Wheel odometry data comprises wheel rotation speed for a wheel. The wheel odometry processing submodule 950 knowing a circumference of the wheel can calculate a velocity of the vehicle.

The velocity modeling submodule 960 generates a confidence score for global coordinates in the location data received from the GNSS receiver. In some embodiments, the velocity modeling submodule 960 generates a probabilistic model of velocity at a point in time by taking the velocity calculated with the location data and the spatial variance associated with the global coordinates. The probabilistic model is configured to input a velocity of the vehicle and output a confidence score based on the probabilistic model. In some example implementations, the probabilistic model is defined as a Gaussian distribution using the velocity calculated from the location data as the mean and the variance. Other probabilistic distributions may be used to model the velocity to determine a confidence score. In additional embodiments, the velocity modeling submodule 960 may generate a confidence score for a plurality of velocities calculated with the additional sensor data. The velocity modeling submodule 960 may average the confidence scores for the plurality of calculated velocities as the confidence score for the global coordinates.

In embodiments with the machine learning model 980, the feature generation submodule 970 generates a feature vector for a set of global coordinates at a point in time. The feature generation submodule 970 identifies features from the sensor data 230, the features which constitute the feature vector. The features include global coordinates at the point in time, acceleration data at the point in time, an image frame from the image data at the point in time, a LIDAR scan from the LIDAR data at the point in time, a SONAR scan from the SONAR data at the point in time, a RADAR scan from the RADAR data at the point in time, wheel odometry data, or any combination thereof. The features may further include other intermediary or calculated data values, i.e., calculated velocities, satellite signals, radio frequencies at which the satellite signals were detected, objects extracted from the image data, objects extracted from the LIDAR point clouds, a location type of the environment (e.g., determined by the image processing submodule 930), calculated velocities, or any combination thereof. In one embodiment, the feature generation submodule 970 applies dimensionality reduction (e.g., via linear discriminant analysis (LDA), principle component analysis (PCA), or the like) to reduce the amount of data in the feature vectors to a smaller, more representative set of features used in the machine learning model 980.

The machine learning model 980 inputs a feature vector and outputs a confidence score for the global coordinates at that point in time. The machine learning model may be trained by the perception module 210 with training data. The training data may be collected from past trips by other vehicles 150 that were well calibrated and run in no interference locations. In other embodiments, training data may be synthesized from computer simulations of vehicles driving in various conditions that could affect sensor data, such as GNSS signal. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. Further, the perception module 210 may perform validation tests with the machine learning model 980 to determine an accuracy of the machine learning model 980. When sufficiently trained, the machine learning model 980 inputs the feature vector based on the sensor data 230 (e.g., collected at a point in time) and outputs a confidence score for the global coordinates (e.g., at that point in time).

The location validation submodule 990 validates the location data based on the confidence score. The location validation submodule 990 may label global coordinates of the location data valid or invalid based on whether the confidence score is above a threshold. With the validated global coordinates or more generally the validated location data, the perception module 210 may provide the validated location data to other modules in the vehicle computing system 120, e.g., for use in navigating the vehicle or updating the HD map with the validated location data and other sensor data 230.

In some embodiments, the location validation submodule 990 generates an uncertainty map. The location validation submodule 990 assigns an uncertainty score to each set of global coordinates from the location data a spatial window FIGS. 10A & 10B include flowchart 1000 and flowchart 1005 illustrating validation of location data with a velocity consensus, according to some embodiments. Flowchart 1000 and flowchart 1005 may be performed by the vehicle computing system 120, referred to as the system 120. Without loss of generality, various steps are performable by the perception module 210 and its various submodules. Moreover, flowchart 1000 and flowchart 1005 attempt to capture the essence of the validation process without restricting away from broader principles described above. The difference between flowchart 1000 and flowchart 1005 lies in the substitution of steps 1040 and 1050 (in flowchart 1000) with steps 1045 and 1055 (in flowchart 1005).

At step 1010, the system 120 receives location data from a GNSS receiver located on a vehicle. The vehicle refers to vehicle 150 where the vehicle computing system 120 resides. In addition, the GNSS receiver is one of the many vehicle sensors 105 that generate sensor data 230. The location data includes a first set of global coordinates that is determined by the GNSS receiver (or by the GNSS processing submodule 910) with multiple satellite signals from satellites of the GNSS. Generally, the GNSS receiver can determine the global coordinates with quadrilateration of four satellite signals. In some instances, the GNSS receiver establishes a ground plane and then determines the global coordinates with trilateration of three satellite signals on the established ground plane.

At step 1020, the system 120 determines a first velocity of the vehicle based on the location data, e.g., via the GNSS processing submodule 910. The system 120 may calculate the first velocity by considering two sets of global coordinates. The system 120 can calculate a distance (Euclidean or spherical) with the two sets of global coordinates and divide the distance by a time differential between the two sets to achieve the first velocity. Alternatively, the system 120 may calculate the first velocity by considering at least one satellite signal received by the GNSS receiver to determine the global coordinates. Based on the radio frequency detected for the satellite signal, the system 120 may calculate the first velocity based on a Doppler shift of the detected radio frequency.

At step 1030, the system generates a probabilistic model of velocity at the first time point based on the first velocity and the variance. The probabilistic model is configured to input a velocity of the vehicle and output a confidence score based on the probabilistic model. In some example implementations, the probabilistic model is defined as a Gaussian distribution using the velocity calculated from the location data as the mean and the variance. Other probabilistic distributions may be used to model the velocity to determine a confidence score.

At step 1040, the system 120 receives additional sensor data including one or more of: acceleration data, image data, LIDAR data, radio detection and ranging (RADAR) data, sound detection and ranging (SONAR) data, wheel odometry data, or any combination thereof. Acceleration data is detected by one or more IMUs. Image data is captured by one or more cameras on the vehicle, e.g., mounted on the top of the vehicle. LIDAR data is captured by a LIDAR sensor on the vehicle. RADAR data and SONAR data may be captured by a RADAR sensor and a SONAR sensor, respectively. Wheel odometry data may be detected by one or more wheel odometers configured to one or more of the wheels of the vehicle. Alternatively, at step 1045 in flowchart 1005, the system 120 receives image data from a camera on the vehicle.

At step 1050, the system 120 determines a second velocity of the vehicle with the additional sensor data. Alternatively, at step 1055, the system 120 determines the second velocity of the vehicle with the image data received at step 1045.

With acceleration data, the second velocity may be determined based on integrating the acceleration data. Additionally, a Kalman filter may be applied to the acceleration data to mitigate IMU noise (bias) in the acceleration data.

With image data, the second velocity may be determined using machine learning techniques, non machine learning techniques, or a combination of both. With machine learning, the system 120 applies a trained machine learning model to the image data of the environment. This machine learning model can be trained with training data comprising video captured by a camera moving at a known velocity, wherein image data is input into the machine learning model and a predicted velocity is output according to the input image data. In non machine learning implementations, the system 120 applies visual odometry techniques to establish a correspondence between two frames in the image data. To establish the correspondence, the system 120 identifies features present in both frames, e.g., through a set of one or more image kernels. The system 120 may calculate an optical flow between the two frames by determining differences between the position of each feature from frame to frame. The system 120 then calculates a displacement of the camera that captured the image data based on the optical flow which can then be used to calculate velocity as displacement over time.

With LIDAR data, the second velocity may be determined by applying a trained machine learning model to the LIDAR data. This machine learning model can be trained with training data comprising LIDAR scans captured by a LIDAR moving at a known velocity, wherein LIDAR data is input into the machine learning model and a predicted velocity is output according to the input LIDAR data. The second velocity is alternatively calculated with RADAR data or SONAR data in a process similar to the LIDAR data.

At step 1060, the system 120 calculates a confidence score for the second velocity by applying the probabilistic model to the second velocity, e.g., via the velocity modeling submodule 960. In other embodiments, the system 120 calculates additional velocities with the additional sensor data and may also calculate a confidence score for each of the additional velocities by applying the probabilistic model.

At step 1070, the system 120 validates the location data based on the confidence score, e.g., via the location validation submodule 990. In embodiments where the confidence score At this juncture, the system 120 may utilize the validated location data. In one application at step 1080, the system 120 generates navigation instructions based on the validated location data, e.g., via the prediction module 215, the planning module 220, and the control module 225. The navigation instructions may be sent to the vehicle controls 130 for navigation of the vehicle. In another application at step 1090, the system 120 updates a HD map (e.g., HD map 510) with the validated location and the other sensor data 230, e.g., via the map update API 285. Other applications of the validated location data include calibrating sensors, generating part of the HD map, etc.

FIG. 11 is a flowchart 1100 illustrating validation of location data with a machine learning model, according to one or more embodiments. The flowchart 1100 may be performed by the vehicle computing system 120, referred to as the system 120 throughout the flowchart 1100. Without loss of generality, various steps are performable by the perception module 210 and its various submodules. Moreover, the flowchart 1100 attempts to capture the essence of the validation process without restricting away from broader principles described above.

At step 1110, the system 120 receives sensor data including location data from a GNSS receiver on a vehicle, acceleration data from an IMU on the vehicle, image data of an environment surround the vehicle from a camera on the vehicle, and LIDAR data from a LIDAR on the vehicle. The location data includes a first set of global coordinates that is determined by the GNSS receiver (or by the GNSS processing submodule 910) with multiple satellite signals from satellites of the GNSS. In other embodiments, the additional sensor data further includes one or more of: radio detection and ranging (RADAR) data and sound detection and ranging (SONAR) data.

At step 1120, the system 120 generates a feature vector based on the location data, the acceleration data, the image data, and the LIDAR data. The features may include some combination of raw data from the sensors. In addition, the features may include some processed data processed from the raw data, e.g., velocities, objects identified from the image data or the LIDAR data. The feature vector comprises the extracted features.

At step 1130, the system 120 determines a confidence score for the location data for the vehicle by applying a trained machine learning model to the feature vector. The machine learning model is trained on training data of past trips taken by the vehicle, and wherein the trained machine learning model inputs feature vectors based on the location data, the acceleration data, the image data, and the LIDAR data, and outputs a confidence score to each set of global coordinates in the location data.

At step 1140, the system 120 validates the location data based on the confidence score, e.g., via the location validation submodule 990. The system 120 evaluates whether the confidence score output from the machine learning model is above a threshold.

At this juncture, the system 120 may utilize the validated location data in a similar manner to flowchart 1000. In one application at step 1150, the system 120 generates navigation instructions based on the validated location data, e.g., via the prediction module 215, the planning module 220, and the control module 225. The navigation instructions may be sent to the vehicle controls 130 for navigation of the vehicle. In another application at step 1160, the system 120 updates a HD map (e.g., HD map 510) with the validated location and the other sensor data 230, e.g., via the map update API 285. Other applications of the validated location data include calibrating sensors, generating part of the HD map, etc.

FIG. 12 is a flowchart illustrating use of an uncertainty map to validate GNSS location data, according to one or more embodiments. The flowchart 1100 may be performed by the vehicle computing system 120, referred to as the system 120 throughout the flowchart 1100. Without loss of generality, various steps are performable by the perception module 210 and its various submodules. Moreover, the flowchart 1100 attempts to capture the essence of the validation process without restricting away from broader principles described above.

At step 1205, the system 120 receives location data including plurality of sets of global coordinates from a GNSS receiver on the vehicle, each set of global coordinates determined by a plurality of satellite signals and associated with a variance of the satellite signals. The variance comes from the imprecision of the satellite signals, e.g., there is a spatial volume of potential sets of global coordinates based on the received satellite signals not intersecting at a spatial point.

At step 1210, the system 120 receives sensor data including acceleration data from an IMU on the vehicle, image data of an environment surround the vehicle from a camera on the vehicle, and LIDAR data from a LIDAR on the vehicle. The location data includes a first set of global coordinates that is determined by the GNSS receiver (or by the GNSS processing submodule 910) with multiple satellite signals from satellites of the GNSS. In other embodiments, the additional sensor data further includes one or more of: radio detection and ranging (RADAR) data and sound detection and ranging (SONAR) data.

At step 1215, the system 120 generates a HD map with the location data and the sensor data. In one embodiment, the system 120 creates the HD map and populates spatial positions of the ground, buildings, street signs, other objects etc. that are detected by the sensor data. In other embodiments, the system 120 rather updates an existing HD map when there is a sufficient discrepancy between the HD map and the sensor data, e.g., a tree detected by the sensor data is not coincident with the tree populated in the HD map.

At step 1220, the system 120 generates an uncertainty map parallel to the HD map, wherein the uncertainty map, stores variance of each set of global coordinates over the spatial volume. The uncertainty map may also store confidence scores calculated for the location data, e.g., calculated according to the principles described above in FIGS. 9-11. When queried regarding a location in the uncertainty map, the system 120 may retrieve a variance describing a relative uncertainty for GNSS signals at that location. This may be useful in regions where GNSS tends to be inaccurate as the system 120 may query the uncertainty map to get a baseline confidence of location data received by the GNSS receiver.

At step 1225, the system 120 receives new sensor data. The new sensor data may include new acceleration data from the IMU on the vehicle, new image data of a new environment surrounding the vehicle from the camera on the vehicle, and LIDAR data from the LIDAR on the vehicle. In other embodiments, the sensor data further includes RADAR data, SONAR data and wheel odometry data.

At step 1230, the system 120 determines a location of the vehicle in the HD map according to the new sensor data. The localization may be accomplished by the localization API 250.

At step 1235, the system 120 retrieves a variance at the location of the vehicle from the uncertainty map. The variance, as mentioned above, describes a relative uncertainty of GNSS signals at that location, e.g., an urban region surrounded by many tall skyscrapers may be more prone to GNSS inaccuracies.

At step 1240, the system 120 receives new location data including a first set of global coordinates from the GNSS receiver.

At step 1245, the system 120 validates the first set of global coordinates according to the retrieved variance. The system 120 may use the retrieved variance as a baseline confidence of whether the first set of global coordinates are accurate or inaccurate. The system 120 may further proceed with subsequent validation calculations, e.g., principles described in FIGS. 10A, 10B, and 11. With the validated location data, the system 120 may navigate the vehicle or update the HD map.

Computing Machine Architecture

Figure 13:
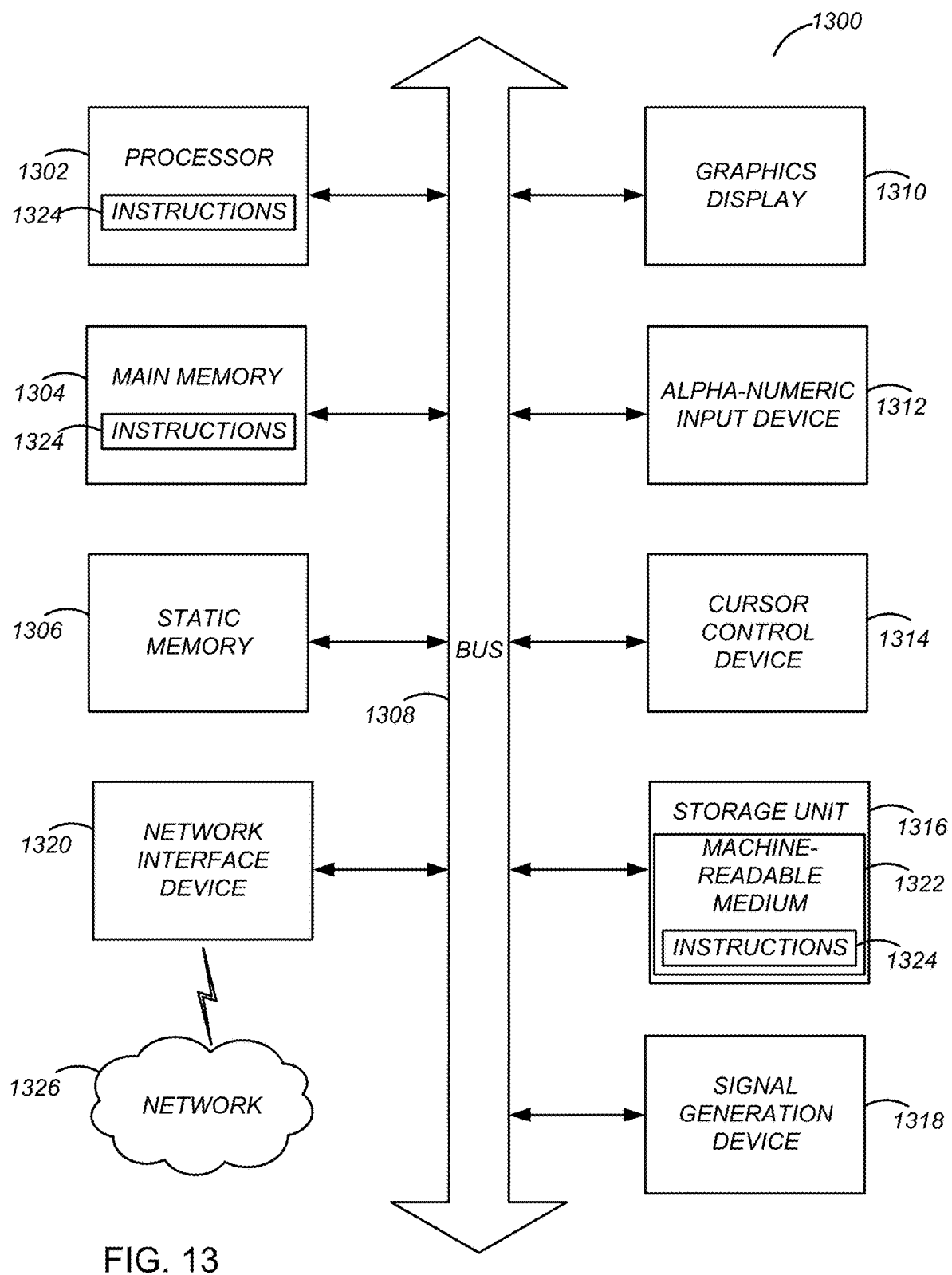
FIG. 13 illustrates an embodiment of a computing machine that can read instructions from a machine-readable medium and execute the instructions in a processor or controller.

FIG. 13 is a block diagram illustrating components of an example machine able to read instructions from a machine-readable medium and execute them in a processor (or controller). Specifically, FIG. 13 shows a diagrammatic representation of a machine in the example form of a computer system 1300 within which instructions 1324 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes a processor 1302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1304, and a static memory 1306, which are configured to communicate with each other via a bus 1308. The computer system 1300 may further include graphics display unit 1310 (e.g., a plasma display panel (PDP), a liquid crystal display (LCD), a projector, or a cathode ray tube (CRT)). The computer system 1200 may also include alphanumeric input device 1312 (e.g., a keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A computer implemented method comprising:
   receiving location data from a Global Navigation Satellite System (GNSS) receiver located on an autonomous vehicle;
   receiving acceleration data from an inertial measurement unit (IMU) located on the autonomous vehicle;
   receiving image data of an environment surrounding the autonomous vehicle from a camera located on the autonomous vehicle;
   receiving light detection and ranging (LIDAR) data from a LIDAR located on the autonomous vehicle;
   generating a feature vector comprising features based on the location data, the acceleration data, the image data, and the LIDAR data;
   determining a confidence score for the location data for the vehicle by applying a trained machine learning model to the feature vector, wherein the trained machine learning model is trained on training data of past trips taken by one or more vehicles with sensor data associated with the past trips, and wherein the trained machine learning model receives as input, an input feature vector based on the location data, the acceleration data, the image data, and the LIDAR data, and outputs a confidence score for each set of global coordinates in the location data;
   validating the location data based on the confidence score; and
   navigating the autonomous vehicle according to the validated location data.

2. The computer implemented method of claim 1, wherein the location data comprises a first set of global coordinates determined at a first point in time, wherein the features include the first set of global coordinates at the first point in time.

3. The computer implemented method of claim 2, wherein the first set of global coordinates are calculated with a first satellite signal at a first radio frequency, a second satellite signal at a second radio frequency, and a third satellite signal at a third radio frequency, wherein the features include the first satellite signal, the first radio frequency, the second satellite signal, the second radio frequency, the third satellite signal, and the third radio frequency.

4. The computer implemented method of claim 2, wherein the location data further comprises a second set of global coordinates determined at a second point in time, wherein the features include the second set of global coordinates at the second point in time.

5. The computer implemented method of claim 1, further comprising:
   classifying a location type of the environment where the autonomous vehicle is located based on one or more of: the image data and LIDAR data,
   wherein the features include the location type of the environment.

6. The computer implemented method of claim 1, further comprising:
   receiving sound detection and ranging (SONAR) data from a SONAR located on the autonomous vehicle,
   wherein the features include the SONAR data, and
   wherein the machine learning model inputs the feature vector including the SONAR data.

7. The computer implemented method of claim 1, further comprising:
   receiving radio detection and ranging (RADAR) data from a RADAR located on the autonomous vehicle,
   wherein the features include the RADAR data, and
   wherein the machine learning model inputs the feature vector including the SONAR data.

8. The computer implemented method of claim 1, further comprising:
   receiving wheel odometry data from a wheel odometer located on a wheel of the autonomous vehicle,
   wherein the features include the wheel odometry data, and
   wherein the machine learning model inputs the feature vector including the SONAR data.

9. A computer implemented method comprising:
   receiving location data including a first set of global coordinates for the autonomous vehicle at a first point in time and a second set of global coordinates for the autonomous vehicle at a second point in time from a Global Navigation Satellite System (GNSS) receiver located on an autonomous vehicle, the first set of global coordinates determined by a plurality of satellite signals and associated with a variance of the plurality of satellite signals;
   determining a first velocity of the autonomous vehicle at the first time point based on the first set of global coordinates and the second set of global coordinates;
   generating a probabilistic model of velocity at the first point in time based on the first velocity and the variance, wherein the probabilistic model inputs a velocity at the first time point and outputs a confidence score;

receiving additional sensor data including one or more of: acceleration data, image data of an environment surrounding the autonomous vehicle, light detection and ranging (LIDAR) data, radar detection and ranging (RADAR) data, sound detection and ranging (SONAR) data, and wheel odometry data;

determining a second velocity of the autonomous vehicle at the first time point based on the additional sensor data;

calculating a confidence score for the second velocity by applying the probabilistic model to the second velocity;

validating the location data based on the confidence score; and navigating the autonomous vehicle using the validated location data.

10. The computer implemented method of claim 9, wherein the first velocity is calculated by:
measuring a Euclidean distance between the first set of global coordinates and the second set of global coordinates; and
dividing the distance by a time differential between the first point in time and the second point in time.

11. The computer implemented method of claim 9, wherein the plurality of satellite signals includes a first satellite signal received at a first radio frequency, wherein the first velocity is calculated by measuring a Doppler shift of the first satellite signal based on the first radio frequency.

12. The computer implemented method of claim 9, wherein the second velocity is determined based on integrating the acceleration data.

13. The computer implemented method of claim 9, further comprising applying a Kalman filter to the acceleration data to remove IMU bias in the acceleration data.

14. The computer implemented method of claim 9, wherein the second velocity is determined by applying a trained machine learning model to the image data of the environment, wherein the trained machine learning model is trained with training data comprising video captured by a camera moving at a known velocity, wherein image data is input into the machine learning model and a predicted velocity is output according to the input image data.

15. The computer implemented method of claim 9, wherein the second velocity is determined by applying a trained machine learning model to the LIDAR data, wherein the trained machine learning model is trained with training data comprising LIDAR scans captured by a LIDAR moving at a known velocity, wherein LIDAR data is input into the machine learning model and a predicted velocity is output according to the input LIDAR data.

16. The computer implemented method of claim 9, wherein the second velocity is determined by applying a trained machine learning model to the RADAR data, wherein the trained machine learning model is trained with training data comprising RADAR scans captured by a RADAR moving at a known velocity, wherein RADAR data is input into the machine learning model and a predicted velocity is output according to the input RADAR data.

17. The computer-implemented method of claim 9, wherein the second velocity is determined by applying a trained machine learning model to the SONAR data, wherein the trained machine learning model is trained with training data comprising SONAR scans captured by a SONAR moving at a known velocity, wherein SONAR data is input into the machine learning model and a predicted velocity is output according to the input SONAR data.

18. The computer implemented method of claim 9, further comprising:
determining a second velocity of the autonomous vehicle at the first time point based on the additional sensor data; and
calculating a second confidence score for the third velocity by applying the probabilistic model to the third velocity,
wherein validating the location data is further based on the second confidence score.

19. The computer implemented method of claim 9, further comprising:
in response to validating the location data, determining a difference between high-definition (HD) map data and the additional sensor data; and
updating the HD map data with the additional sensor data.

20. A computer implemented method comprising:
receiving location data including a first set of global coordinates for an autonomous vehicle at a first point in time and a second set of global coordinates for the autonomous vehicle at a second point in time from a Global Navigation Satellite System (GNSS) receiver located on the autonomous vehicle, the first set of global coordinates is determined by a plurality of satellite signals and is associated with a variance of the plurality of satellite signals;
determining a first velocity of the autonomous vehicle at the first point in time based on the first set of global coordinates and the second set of global coordinates;
generating a probabilistic model of velocity at the first time point based on the first velocity and the variance, wherein the probabilistic model inputs a velocity at the first time point and outputs a confidence score;
receiving image data of an environment surrounding the autonomous vehicle from a camera located on the vehicle;
determining a second velocity of the autonomous vehicle at the first time point by:
identifying a plurality of features in a first frame of the image data,
identifying the plurality of features in a second frame of the image data,
establishing an image correspondence between the first frame and the second frame based on identification of the plurality of features in the first frame and the identification of the plurality of features in the second frame, and
calculating the second velocity based on a comparison of the plurality of features in the first frame and the plurality of features in the second frame;
calculating a confidence score for the second velocity by applying the probabilistic model to the second velocity;
validating the location data based on the confidence score; and
navigating the autonomous vehicle according to the validated location data.

21. The computer implemented method of claim 20, wherein the first velocity is calculated by:
measuring a Euclidean distance between the first set of global coordinates and the second set of global coordinates; and
dividing the distance by a time differential between the first point in time and the second point in time.

22. The computer implemented method of claim 20, wherein the first set of global coordinates is determined by the GNSS receiver receiving at least a first satellite signal from a first satellite at a first radio frequency, wherein the first velocity is calculated by measuring a Doppler shift of the first satellite signal based on the first radio frequency.

23. The computer implemented method of claim 20, wherein the plurality of satellite signals includes a first satellite signal from a first satellite, a second satellite signal from a second satellite, and a third satellite signal, wherein a HD map of an environment where the vehicle is located comprises occupancy grid data describing spatial position of a road, and wherein the first set of global coordinates is determined by calculating trilateration of the first satellite signal, the second satellite signal, and the third satellite signal on the road.

24. The computer implemented method of claim 20, wherein calculating the second velocity based on the comparison of the plurality of features in the first frame and the plurality of features in the second frame comprises:
   calculating an optical flow by determining a difference in position of each feature of the plurality of features between the first frame and the second frame, wherein the optical flow describes a relative velocity of each pixel in the image data between the first frame and the second frame;
   calculating a displacement of the camera from the first point in time to the second point in time based on the optical flow; and
   calculating the second velocity by dividing the displacement of the camera from the first point in time to the second point in time over a time differential of the first point in time and the second point in time.

25. The computer implemented method of claim 20, wherein identifying the first feature at the first position in the first frame of the image data comprises applying one or more image kernels to the first frame; and
   wherein identifying the first feature at a second position in a second frame of the image data comprises applying the one or more image kernels to the second frame.

26. A computer implemented method comprising:
   receiving location data including a plurality of sets of global coordinates for an autonomous vehicle at a plurality of points in time from a Global Navigation Satellite System (GNSS) receiver located on the autonomous vehicle, each global coordinate determined by a plurality of satellite signals and associated with a variance of the plurality of satellite signals;
   receiving sensor data including one or more of: acceleration data, image data of an environment surrounding the autonomous vehicle, light detection and ranging (LIDAR) data, radar detection and ranging (RADAR) data, sound detection and ranging (SONAR) data, and wheel odometry data;
   generating a high-definition (HD) map with the location data and the sensor data, the HD map comprising occupancy grid data describing spatial positions of one or more objects;
   generating an uncertainty map parallel to the HD map, the uncertainty map storing the variance of each set of global coordinates over a spatial volume;
   receiving new sensor data including one or more of: new acceleration data, new image data of a new environment surrounding the autonomous vehicle, new light detection and ranging (LIDAR) data, new radar detection and ranging (RADAR) data, new sound detection and ranging (SONAR) data, and new wheel odometry data;
   determining a location of the autonomous vehicle in the HD map according to the new sensor data;
   retrieving a variance for the location of the autonomous vehicle from the uncertainty map;
   receiving new location data including a first set of global coordinates for the autonomous vehicle from the GNSS receiver;
   validating the first set of global coordinates according to the retrieved variance; and
   navigating the autonomous vehicle with the validated first set of global coordinates.

* * * * *